United States Statutory Invention Registration [19]

[11] Reg. Number: H164

Savioli [43] Published: Nov. 4, 1986

[54] HIGH CAPACITY MAGAZINE FOR WEAPONS

[75] Inventor: Giulio Savioli, Andover, N.J.

[73] Assignee: The United States of America as represented by the Secretary of the Army, Washington, D.C.

[21] Appl. No.: 838,540

[22] Filed: Mar. 7, 1986

[51] Int. Cl.[4] ..... F41C 25/10

[52] U.S. Cl. ..... 89/33.02

*Primary Examiner*—Stephen C. Bentley

*Attorney, Agent, or Firm*—Anthony T. Lane; Harold H. Card, Jr.; Michael C. Sachs

[57] ABSTRACT

A magazine for a weapon having a barrel extending in a firing direction includes a cartridge storage drum which stores a multiplicity of cartridges in a spiral path with a longitudinal axis of the cartridges lying perpendicularly to the firing direction. If the weapon is an automatic rifle, the storage drum can be mounted in or under the stock of the rifle. A guide made up of curved rods extends from the drum and defines a guide path along which the cartridges are fed and rotated from their respect to the firing direction. A feed box is connected to the end of the guide rods at a location remote from the drum for feeding the cartridges to a bolt and chamber area of the weapon. Along the guide path the cartridges engage each other at pivot points so that the cartridges are somewhat free to pivot within the confines of the guide rods but still push each other along the guide path. One or more followers are provided behind the last cartridge. A cable is connected to the last guide follower and extends through the drum and along the guide path. The end of the cable is connected to a spring motor which pulls the cable. The followers is thus pulled which in turn pushes the cartridges through the drum and along the guide path.

15 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 4
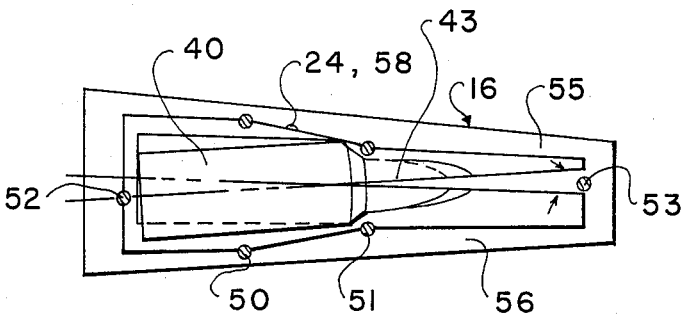
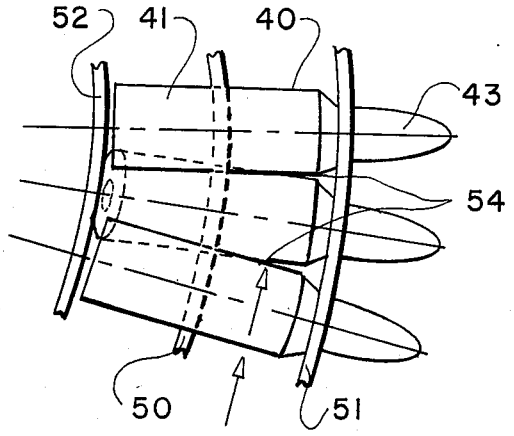
FIG. 5

FIG. 6
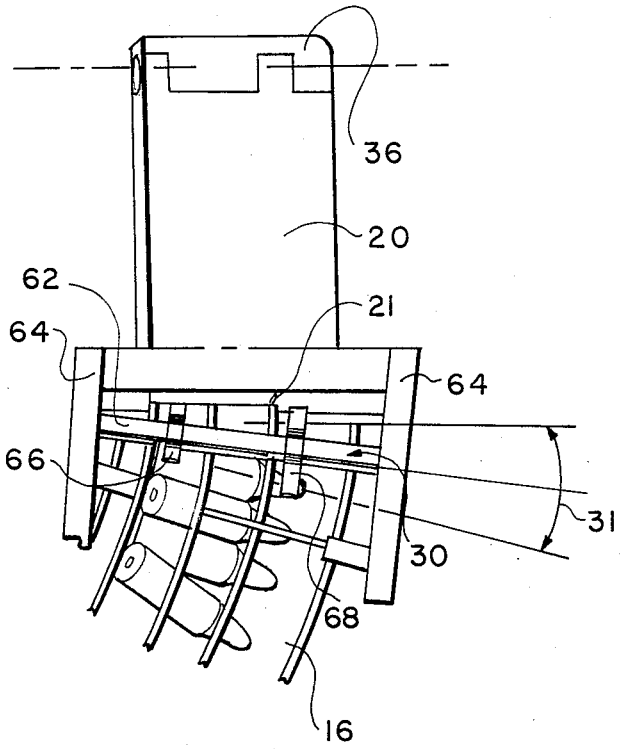
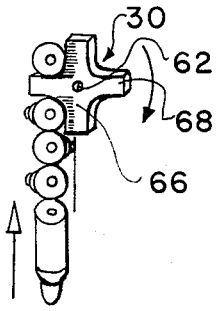
FIG. 7

HIGH CAPACITY MAGAZINE FOR WEAPONS

The invention described herein may be manufactured, used and licensed by or the Government for Governmental purposes without the payment to me of any royalties thereon.

FIELD AND BACKGROUND OF THE DISCLOSURE

The present invention relates in general to firearms magazines and in particular to a new and useful high capacity magazine which is particularly suited for automatic and semi-automatic weapons, and which includes a storage drum which carries a multiplicity of cartridges in a spiral path with the longitudinal axes of the cartridges lying substantially perpendicular to the firing direction for the weapon.

High capacity magazines are known for use primarily with automatic weapons. One example is the drum type magazine in which a multiplicity of cartridges are stored with their longitudinal axes lying parallel to a firing direction of the weapon. The drum is engaged to the bottom of the weapon near its firing chamber. While a large number of cartridges can thus be stored and supplied to the weapon, the drum is awkward and bulky. The drum greatly increases the effective width of the weapon since it extends to both sides of the weapon.

Other magazines are also known which carry the cartridges in a straight or somewhat curved line. The magazines are attached to the bottom of a weapon with the cartridges being fed one at a time and upwardly to the weapon using a spring connected to a plate-like follower. So as to carry a large number of cartridges, such magazines must be exceptionally long. This again produces an awkward and bulky configuration for the weapon plus magazine combination.

SUMMARY OF THE INVENTION

The present invention is drawn to an improved high capacity magazine for weapons wherein a multiplicity of cartridges are carried in a drum with their longitudinal axes lying perpendicular to a firing direction of the weapon. In this way the drum can be conveniently stored in or under the stock of the weapon, or in any other suitable location. A prime advantage of the invention is that the effective width of the weapon is either not increased at all or only slightly increased. The width of the magazine is substantially the same as the length of the cartridge so that where short caseless cartridges are utilized, the width of the weapon is not adversely affected.

An important feature of the invention is the use of guide means which are connected between an output of the drum and a receiving opening for cartridges to the weapon. A guide path is defined along these guide means which rotates the cartridges from their perpendicular position toward a position where they are parallel with the firing direction. In a final feed area the cartridges are brought parallel to the firing direction so that they can be sequentially fed to the chamber of the weapon in a conventional manner.

Accordingly an object of the invention is to provide a high capacity magazine for a weapon having a barrel extending in a firing direction, comprising a cartridge storage drum for storing a plurality of cartridges with longitudinal axes thereof lying substantially perpendicular to the firing direction when the magazine is attached to the weapon, guide means connected to the drum for guiding cartridges from the drum along a guide path to rotate the cartridges from their perpendicular position toward a parallel position with respect to the firing direction, and drive means for driving the cartridges from the drum to the guide means and along the guide path.

Another object of the present invention is to provide a high capacity magazine for weapons which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWINGS

FIG. 4 is a sectional view taken through the guide path in the transition zone of the high capacity magazine;

FIG. 5 is a partial side elevational view of the transition zone;

FIG. 6 is a partial side perspective view of the high capacity magazine in part of its transition zone and its feed zone; and FIG. 7 is a rear elevational view showing how cartridges are fed from the transition zone to the feed zone by a sprocket arrangement.

DESCRIPTION OF THE PREFERRED EMBODIMENT

Figure 1:
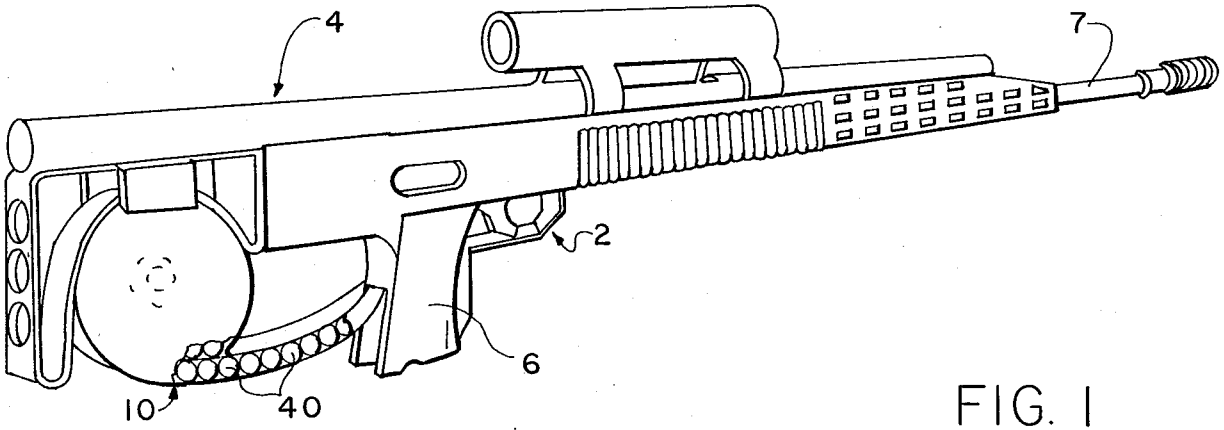
FIG. 1 is a side perspective view of the high capacity magazine of the invention attached to an automatic rifle.

Referring to the drawings in particular, the invention embodie in FIG. 1 is a high capacity magazine generally designated 10 for a weapon such as a semi and/or fully automatic rifle generally designated 2. Rifle 2 has a stock 4 into which or under which the magazine 10 can be seated. Magazine 10 includes guide means for feeding cartridges (some of which are shown in a portion of magazine 10 from which the cover has been cut away) into a hand grip 6 of the rifle 2. The rifle includes a barrel 7 for firing projectiles in a firing direction.

A primary advantage of the present invention is that the cartridges 40 are stored in a storage drum of the magazine 10 with their longitudinal axes lying substantially perpendicular to the firing direction of the weapon.

Figure 2:
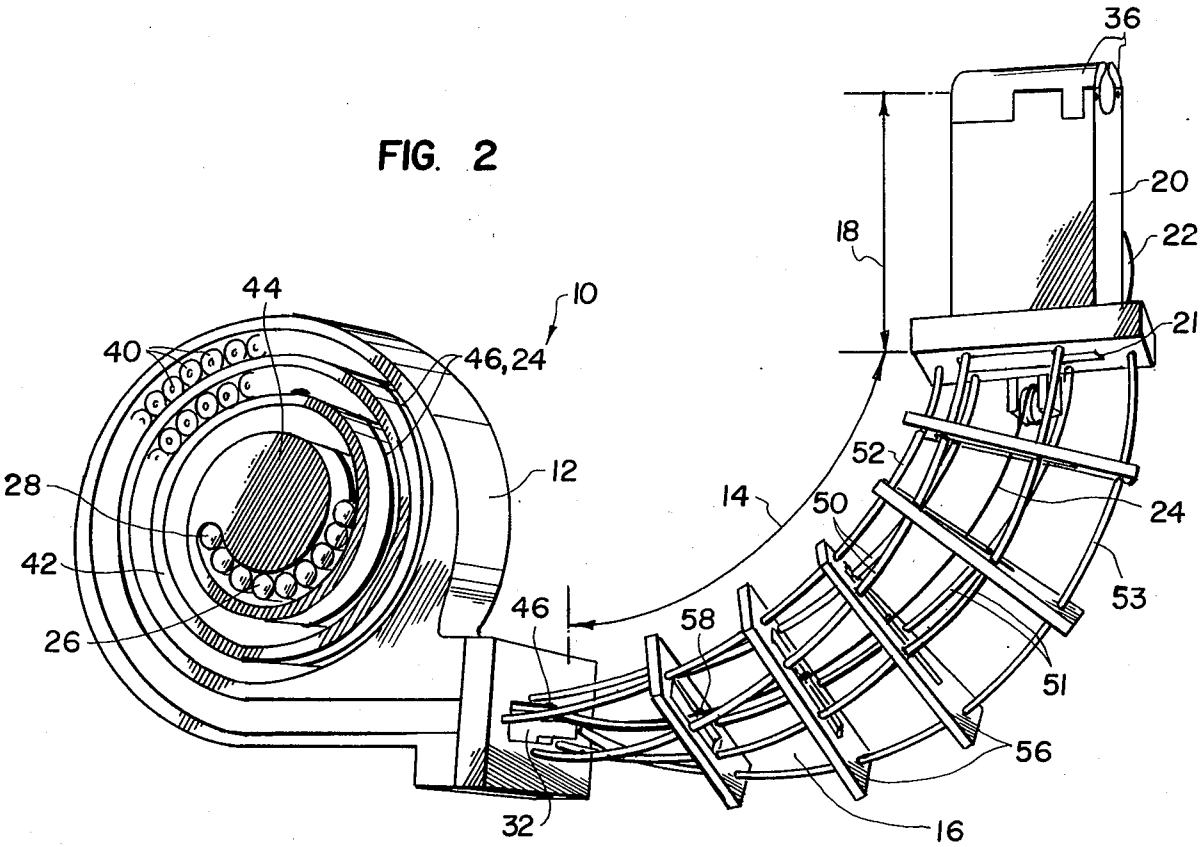
FIG. 2 is a perspective view of an embodiment for the high capacity magazine of the invention.

FIG. 2 shows an embodiment of the magazine 10. Magazine 10 includes a cartridge storage drum 12 which stores a multiplicity of cartridges 40 on a spiral path. Cartridge guide means 16 is connected to an outlet 32 of drum 12 for conveying cartridges along a curved path and for rotating the cartridges from a position with their longitudinal axis at a perpendicular position with respect to the firing direction, toward a parallel position with respect to the firing direction. Guide means 16 extends along a transition zone 14 and defines a guide path along this transition zone.

A feed box 20 having an inlet 21 is connected to an end of the guide means 16 remote from drum 12. Box 20 defines a feed path along a feed zone 18. Cartridges in this feed zone are positioned one above the other and all parallel to the firing direction.

Drum 12 comprises a spirally wound plate 42 having an inner end with an enlargement 44. Plate 42 defines a spiral path for cartridges 40 in drum 12. A groove 46 is defined in a surface of plate 42. Plate 42 with its groove 46 terminates at drum outlet 32. A plurality of followers 26 including a last follower 28 are connected together and positioned in the deepest part of the spiral path in drum 12 when the magazine is filled with cartridges 40. Only some cartridges are shown in FIG. 2 however, for clarity. In practice the entire spiral path would be filled with cartridges all the way to outlet 32 and entirely along guide means 16 and feed box 20.

The purpose of the followers 26, 28 is to push cartridges 40 along the spiral path and through the zones 14 and 18. To accomplish this the last follower 28 is connected to a cable 24 which is seated in groove 46 and extends through guide means 16. An opposite end of cable 24 is connected to a spiral spring 23 in a spring motor 22 best shown in FIG. 3. With followers 26,28 in their position shown in FIG. 2, spiral spring 23 of motor 22 is tensioned to its maximum extent. Motor 22 is of a type conventionally found in clocks and has a sufficiently long unwinding path for its spring 23 to pull the last follower 28 all the way from its fully extended position shown in FIG. 2 to its fully retracted position shown in FIG. 3.

Figure 3:
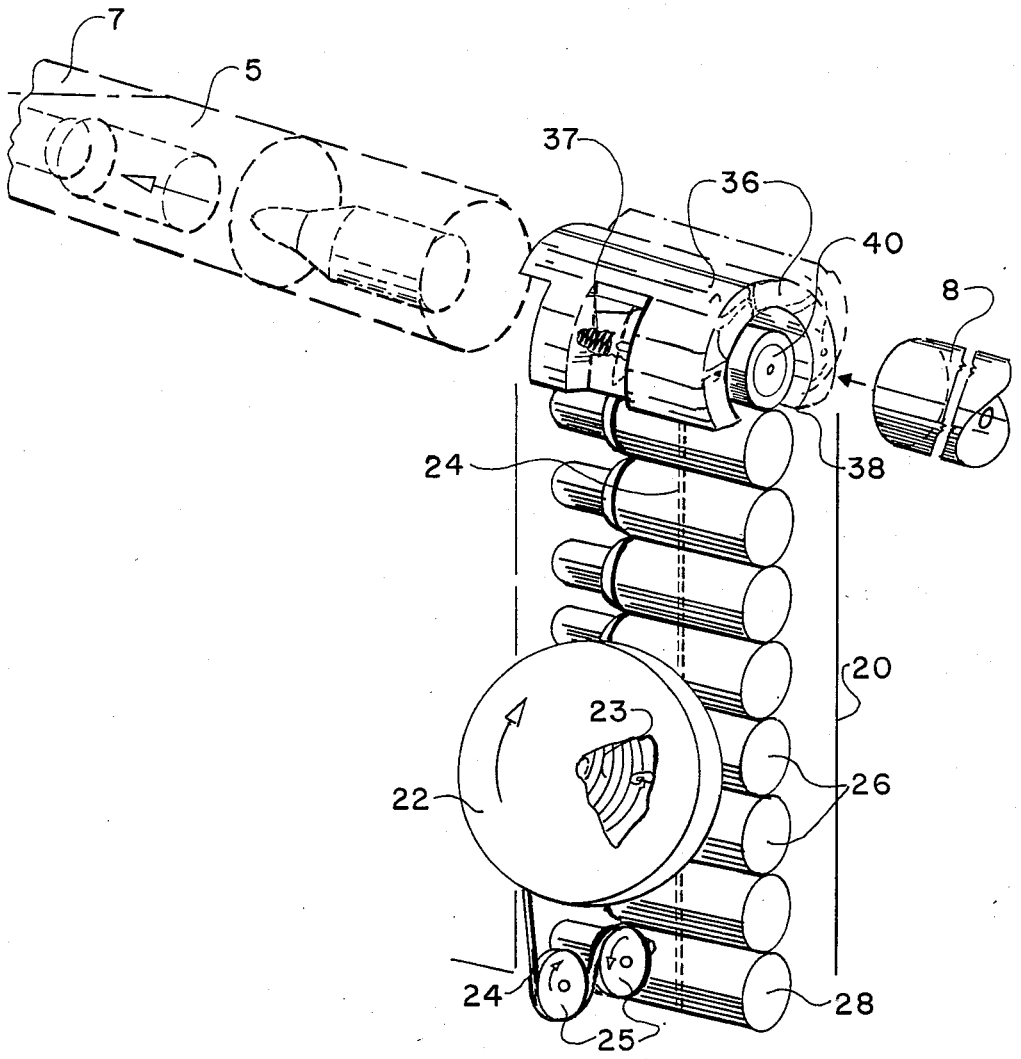
FIG. 3 is a schematic representation of the feed area for the device shown in FIG. 2.

As shown in FIG. 3, cable 24 is entrained around a pair of pulleys 25 which displace a length of cable from the path of the cartridges in the magazine to the inlet for the spring motor 22.

The remaining followers 26 are all connected together and to the last follower 28 by a flexible cable 24 which passes through openings in the followers 26,28. This effectively holds the followers 26 together and to the last follower 28 as the followers are pushed along the cartridge path in the magazine. the number of followers is selected so that they fully fill the box 20 and the feed zone 18 when the last cartridge 40, shown in FIG. 3, is in a position to be fired. Followers 26 thus act as spacers for spacing the last follower 28, and its drive means in the form of spring motor 22 and cable 24, from the firing position for the last cartridge 40. As also shown in FIG. 3, all cartridges including the last cartridge is pushed into a chamber 5 behind barrel 7 of the weapon, by a bolt 8.

At its upper end, closest to the bolt and chamber area, feed box 20 includes a pair of pivotally mounted cartridge stops 36. As shown in FIG. 3, cartridge stops 36 are biased into their solid line position by springs 37 (one of which is shown). When bolt 8 enters the space between stops 36, the stops pivot outwardly into their phantom line position. In this way, the bottom ends 38 of stops 36 move together holding back a following cartridge (or in the case of FIG. 3, the uppermost follower 26).

As shown in FIG. 2,4 and 5, guide means 16 comprises a plurality of curved guide rods 50 through 53 which are held at fixed spaced locations by a plurality of spacer supports 56 which themselves are spaced along the guide path for cartridges in the transition zone 14. Each of the supports 56 includes a groove 58 for receiving and guiding cable 24 in the transition zone 14. Groove 58 is positioned on the inside of the curve defined by guide means 16 so that it will not become dislodged when pulled by the spring motor 22.

Each of the cartridges 40 in the example shown includes a caseless charge portion 41 and a projectile 42. The invention can also be utilized with more conventional cased cartridges where 41 designates a case. Case or caseless portion 41 is substantially cylindrical but also may be in the form of a truncated cone. A shoulder is defined in the forward end of case 41 which receives the projectile 43.

Cartridges 40 are confined to their guide path between pairs of guide rods 50 and 51 and a base rod 52. Forward rods 51 are spaced apart by an amount only slightly greater than the maximum width of the projectiles 43. Rods 50 however, are spaced apart by an amount somewhat greater than the width of case 41. In this way a relative pivoting between adjacent cartridges 40 is possible. The cartridges actually pivot with respect to each other at contact pivot points 54 shown in FIG. 5. In this way an angle 55 shown in FIG. 4 is established between adjacent cartridges. The relative pivoting between adjacent cartridges is necessary to accommodate the inside curve (to the left of FIG. 5) of the feed path in guide means 16. With cylindrical or conical cases 41, the rear end of the cases must overlap each other as they push each other at pivot contact points 54. The base of cartridges 40 slide along rod 52. As shown in FIG. 4 the guide means also includes a forward rod 53 which is solely used to stabilize the relationship between spacer supports 56.

Referring now to FIGS. 6 and 7, the invention includes sprocket means generally designated 30 (and not shown in FIG. 2) which rotates each cartridge through an angle 31 from a first position at the end of guide means 16 to a second position at the inlet of feed box 20. Sprocket means 30 includes a sprocket shaft 62 which is mounted fo free rotation between plates 64 that are fixed to the lower end of box 20. A rear sprocket 66 and a forward sprocket 68 are fixed to shaft 62. Rear sprocket 66 has arms which are slightly curved and of a relatively short length for conveying the rear end of each case 41 for each cartridge 40. Forward or front sprocket 68 has longer arms for conveying the projectiles 43 of each cartridge through a longer path. In this way the cartridges are rotated through angle 31. While a specific embodiment of the invention has been shown and described in detail to illustrate the application of the principles of the invention, it will be understood that the invention may be embodied otherwise without departing from such principles.

What is claimed is:

1. A high capacity magazine for a weapon having a barrel extending in a firing direction, comprising:

a cartridge storage drum for storing a plurality of cartridges with a longitudinal axis of the cartridge lying substantially in a perpendicular position with respect to the firing direction when the magazine is connected to the weapon;

guide means connected to said drum for guiding cartridges from said drum along a curved guide path to rotate the cartridges from their substantially perpendicular position toward a parallel position with respect to the firing direction; and drive means for driving cartridges from said drum to said guide means and along said guide path.

2. A magazine according to claim 1, wherein said storage drum includes a spiral plate defining a spiral groove for receiving cartridges in a single spiral row.

3. A magazine according to claim 1, including a feed box connected to an end of said guide means remote from said drum and for receiving cartridges from an end of said guide path, said feed box defining a straight cartridge path wherein cartridges are movable with their longitudinal axis lying parallel to the firing direction, and sprocket means connected to said guide means and said feed box for rotating cartridges from a position at the end of said guide path with their longitudinal axis at a small angle to the firing direction, to an inlet of said feed box with their longitudinal axis lying parallel to the firing direction.

4. A magazine according to claim 3, wherein said guide means has an inner turn defining an inner curve of said guide path and an outer turn defining an outer curve of said guide path, said sprocket means comprising a shaft freely rotatable to said box adjacent the end of said guide means to which said box is connected, a small sprocket fixed to said shaft adjacent said inner curve and a large sprocket connected to said shaft adjacent said outer curve.

5. A magazine according to claim 4, wherein said guide means comprises a plurality of curved guide rods extending parallel to said guide path and a plurality of spacer supports spaced along said guide path and each connected to all of said guide rods.

6. A magazine according to claim 5, wherein said guide rods includes a base rod for engagement against bases of cartridges sliding along said guide path, a first pair of guide rods being spaced apart by an amount greater than a maximum width of a cartridge and a second pair of guide rods being spaced apart by an amount slightly greater than a maximum width of a projectile of cartridges whereby cartridges moving along said guide path contact each other at a pivot point with adjacent cartridges lying in an angle with respect to each other.

7. A magazine according to claim 6, wherein said drive means comprises a spiral spring motor connected to said feed box and having a spiral spring therein, a cable connected to said spiral spring and extending along said guide path and into said drum, said drum defining a cartridge path therein, a follower connected to said cable and being shaped to bear against a last cartridge in said drum and to push cartridges along said cartridge path in said drum and along said guide path into said feed box.

8. A magazine according to claim 7, wherein each of said supports includes a groove therein for guiding said cable along said guide path in said guide means.

9. A magazine according to claim 8, wherein said drum includes a spiral plate defining said cartridge path as a spiral cartridge path, said plate having a groove therein in which said cable slides along siad spiral cartridge path.

10. A magazine according to claim 1, wherein said guide means comprises a plurality of curved guide rods extending parallel to said guide path and a plurality of spacer supports spaced along said guide path and each connected to all of said guide rods.

11. A magazine according to claim 10, wherein said guide rods includes a base rod for engagement against bases of cartridges sliding along said guide path, a first pair of guide rods being spaced apart by an amount greater than a maximum width of a cartridge and a second pair of guide rods being spaced apart by an amount slightly greater than a maximum width of a projectile of cartridges whereby cartridges moving along said guide path contact each other at a pivot point with adjacent cartridges lying in an angle with respect to each other.

12. A magazine according to claim 2, wherein said drive means comprises a follower movably against cartridges in said spiral path and in said guide path, a spring motor connected to said guide means at an end of said guide means remote from said drum and a cable connected between said spring motor and said follower for pulling said follower along said spiral path and along said guide path.

13. A magazine according to claim 12, wherein said first mentioned follower comprises a last follower and including a plurality of additional followers connected to said last follower and ahead said last follower in a direction toward said spring motor, a feed box connected to said guide means and defining a straight feed path for carrying cartridges with their longitudinal axes parallel to the firing direction, means for rotating cartridges from a position at an end of said guide path remote from said drum into a position with their longitudinal axis parallel to the firing direction, said spring motor being connected to said box and a number of followers being selected so that said followers fill said box when a last cartridge is at an end of said box remote from said drum.

14. A magazine according to claim 13, wherein said guide means comprises a plurality of spaced apart curved guide rods lying parallel to said guide path and a plurality of spacer supports each connected to all of said rods and each being spaced along said guide path.

15. A magazine according to claim 14, wherein said means for rotating cartridges comprises a sprocket shaft rotatably mounted to said box having a pair of sprockets fixed thereon with a sprocket on an inner curve of said guide path being smaller than the sprocket on an outer curve of said guide path.

* * * * *